(12) United States Patent
Basham et al.

(10) Patent No.: US 8,508,185 B2
(45) Date of Patent: Aug. 13, 2013

(54) CHARGING MANAGEMENT METHOD AND SYSTEM

(75) Inventors: Robert Beverley Basham, Aloha, OR (US); Gregory Jensen Boss, Saginaw, MI (US); Rick Allen Hamilton, II, Charlottesville, VA (US); Julianne Frances Haugh, Austin, TX (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 854 days.

(21) Appl. No.: 12/623,483

(22) Filed: Nov. 23, 2009

(65) Prior Publication Data

US 2011/0121791 A1 May 26, 2011

(51) Int. Cl.
*H02J 7/00* (2006.01)
(52) U.S. Cl.
USPC .......................................... 320/109; 320/162
(58) Field of Classification Search
USPC ....................................................... 320/109
See application file for complete search history.

(56) References Cited

U.S. PATENT DOCUMENTS

| | | | |
|---|---|---|---|
| 6,963,186 B2 | 11/2005 | Hobbs | |
| 7,747,739 B2* | 6/2010 | Bridges et al. | 709/224 |
| 8,183,826 B2* | 5/2012 | Tuffner et al. | 320/107 |
| 8,258,746 B2* | 9/2012 | Kirchner | 320/109 |
| 2004/0254688 A1* | 12/2004 | Chassin et al. | 700/295 |
| 2008/0067974 A1 | 3/2008 | Zhang et al. | |
| 2008/0180058 A1 | 7/2008 | Patel et al. | |
| 2008/0203973 A1 | 8/2008 | Gale et al. | |
| 2008/0218121 A1 | 9/2008 | Gale et al. | |
| 2010/0156348 A1* | 6/2010 | Kirchner | 320/109 |
| 2010/0289451 A1* | 11/2010 | Tuffner et al. | 320/109 |
| 2011/0012563 A1* | 1/2011 | Paryani et al. | 320/162 |

* cited by examiner

*Primary Examiner* — Ramy Ramadan
(74) *Attorney, Agent, or Firm* — Schmeiser, Olsen & Watts; Matthew Chung

(57) ABSTRACT

A charging method and system. The method includes detecting and monitoring by a computer processor, a frequency signal associated with an input voltage signal used for powering power consumption devices at a first specified location. The computer processor generates frequency level data associated with the monitoring. The computer processor receives a request to enable a charging process for charging a rechargeable power source and power source data associated with the rechargeable power source and a user. In response to the request, the computer processor enables a customized charging process associated with charging the rechargeable power source based on the frequency level data and/or the power source data.

13 Claims, 11 Drawing Sheets

CHARGING MANAGEMENT METHOD AND SYSTEM

FIELD OF THE INVENTION

The present invention relates to a method and associated system for monitoring a frequency signal and performing a charging management method based on a value of the frequency signal.

BACKGROUND OF THE INVENTION

Monitoring and managing various power consumption devices typically comprises an inaccurate process with little flexibility. Power systems providing power for power consumption devices typically provide the power without the ability to enable any changes. Providing power without the ability to enable any changes limits any flexibility to account for changes within the power systems.

SUMMARY OF THE INVENTION

The present invention provides a charging method comprising:

detecting, by a computer processor of a computing apparatus, a frequency signal associated with an input voltage signal used for powering power consumption devices at a first specified location;

monitoring, by said computer processor, said frequency signal;

generating, by said computer processor, frequency level data associated with said monitoring;

receiving, by said computer processor from a first user, a request to enable a charging process for charging a rechargeable power source;

receiving, by said computer processor, first power source data associated with said rechargeable power source and said first user; and enabling, by said computer processor based on said frequency level data and/or said first power source data, a first customized charging process associated with said charging said rechargeable power source.

The present invention provides a computing system comprising a computer processor coupled to a computer-readable memory unit, said memory unit comprising instructions that when enabled by the computer processor implements a charging method comprising:

detecting, by said computer processor, a frequency signal associated with an input voltage signal used for powering power consumption devices at a first specified location;

monitoring, by said computer processor, said frequency signal;

generating, by said computer processor, frequency level data associated with said monitoring;

receiving, by said computer processor from a first user, a request to enable a charging process for charging a rechargeable power source;

receiving, by said computer processor, first power source data associated with said rechargeable power source and said first user; and enabling, by said computer processor based on said frequency level data and/or said first power source data, a first customized charging process associated with said charging said rechargeable power source.

The present invention advantageously provides a simple method and associated system capable of monitoring and managing various power consumption devices.

DETAILED DESCRIPTION OF THE INVENTION

Figure 1:
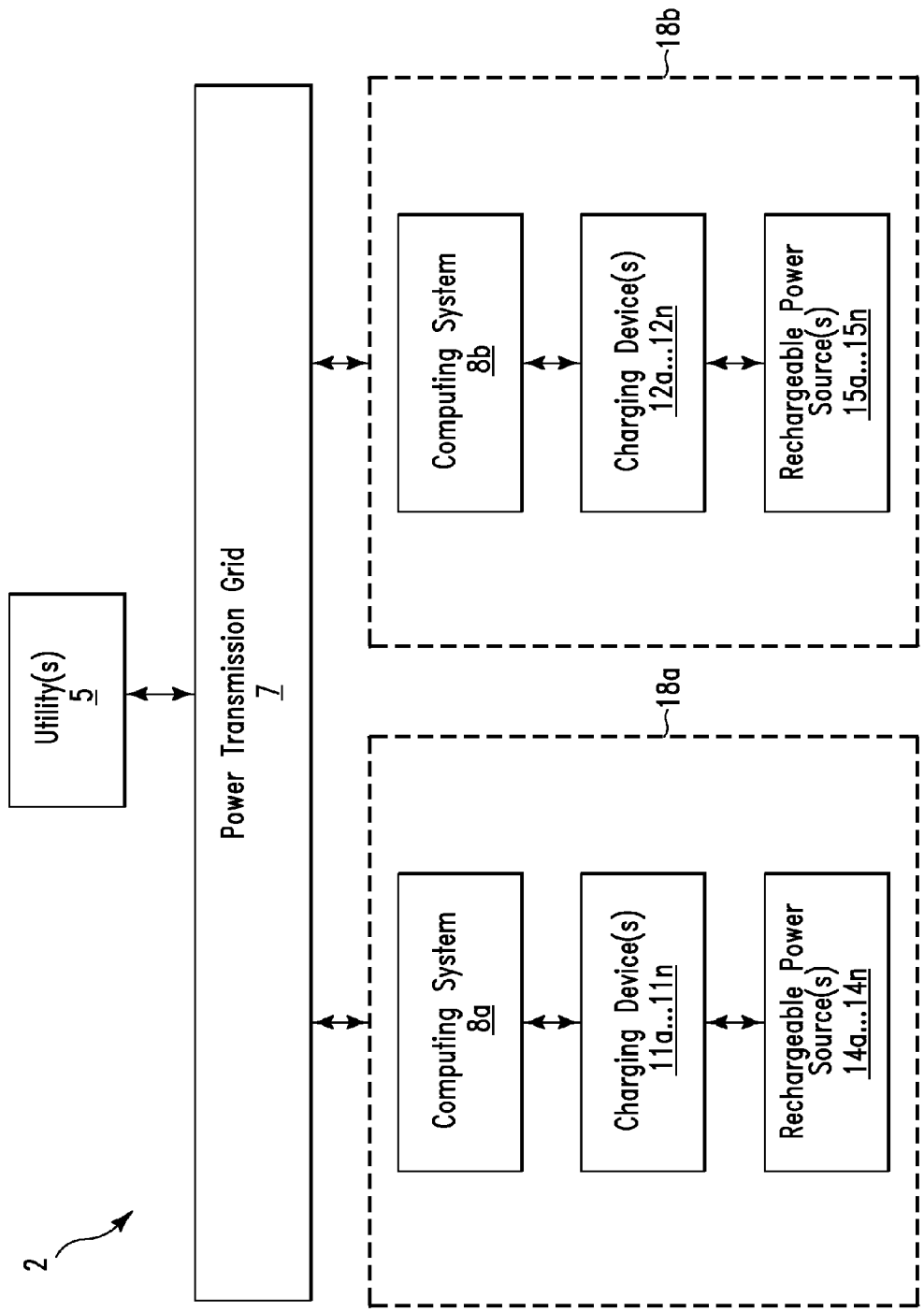
FIG. 1 illustrates a system for monitoring a frequency signal associated with a supply voltage retrieved from a power grid and enabling a customized charging process associated with charging rechargeable power sources, in accordance with embodiments of the present invention.

FIG. 1 illustrates a system 2 for monitoring a frequency signal associated with a supply voltage retrieved from a power grid and enabling a customized charging process associated with charging rechargeable power sources, in accordance with embodiments of the present invention. Load fluctuations associated with power usage by electrical devices (e.g., battery charging devices turning on or off) may cause a frequency signal (e.g., 60 Hertz (Hz)) associated with a supply voltage retrieved from a power grid (e.g., power transmission grid 7) to fluctuate (e.g., rise or fall). When a frequency signal begins to fall below 60 Hz, power providers may bring additional power generation systems on-line. Likewise, when a frequency signal rises above 60 Hz, power providers disable specified power generation systems from the power grid. Power providers may use many different types of power generation systems, including, inter alia:
1. Long-term bulk power generation systems which are very cost effective but typically take a long time (e.g., over an hour) to bring on and off-line.
2. Short-term demand generation systems which are very expensive but may be brought on and off-line very quickly.

A power provider (a utility company) must provide power generation to match a combined electric load demand of all users on the power grid (e.g., users charging automotive batteries for electric vehicles) such that a power frequency signal maintains a level that is as close as possible to a target frequency (e.g., 60 hz). The power provider will use a combination of short-term and long-term bulk power generation systems to match the power demand. Devices such as plug-in hybrid electric vehicles (PHEVs) and electric vehicles (EVs) are required to be recharged and require very high amounts of energy to recharge over relatively short periods. An electrical vehicle plugged into a standard US electrical outlet (i.e., through a charging device) may consume an average of 1.5 kilowatts. Therefore, a 14-20 kilowatt-hour battery pack (40-90 ml) may take over 10 hours to charge. Larger capacity and higher rate chargers plugged into higher capacity receptacles place a greater load on the grid for a shorter period of time, thereby further increasing electric grid load instability. Many electric vehicles may have 150-200 ml battery packs and require even more energy. As these types of rechargeable devices are connected to the grid, a fluctuation of electric demand increases significantly and causes the power provider to compensate with more expensive short-term demand based generation which in turn increases energy costs. Therefore, system 2 is enabled to monitor the frequency signal and perform customized charging process associated with charging rechargeable power sources based on a monitored value of the frequency signal and/or additional data.

System 2 comprises a computing system 8a and a computing system 8b connected to a utility(s) 5 through a power transmission grid 7. Computing system 8a is additionally connected to charging devices 11a . . . 11n and charging devices 11a . . . 11n are connected to rechargeable power sources 14a . . . 14n. Computing system 8b is additionally connected to charging devices 12a . . . 12n and charging devices 12a . . . 12n are connected to rechargeable power sources 15a . . . 15n. Charging devices 11a . . . 11n and 12a . . . 12n may comprise any type of charging device used to charge rechargeable power sources (e.g., batteries), including, inter alia, a battery charger. Rechargeable power sources 14a . . . 14n and 15a . . . 15n may comprise a single rechargeable power source or a plurality of rechargeable power sources (located within and/or associated with powering a single device or located within and/or associated with powering a plurality of different devices). Rechargeable power sources 14a . . . 14n and 15a . . . 15n may comprise any type of rechargeable battery including, inter alia, lead acid, nickel cadmium, nickel metal hydride, lithium ion, lithium ion polymer, nanowire, etc. Computing system 8a, charging devices 11a . . . 11n, and rechargeable power sources 14a . . . 14n are located within a specified location 18a. Computing system 8b, charging devices 12a . . . 12n, and rechargeable power sources 15a . . . 15n are located within a specified location 18b. Specified location 18a and/or 18b may comprise a house and surrounding property, a building (associated with a business) and surrounding property, etc. Alternatively, specified location 18a and/or 18b may each comprise a vehicle such as, inter alia, an automobile, a boat, an aircraft, etc. Electrical power (i.e., for powering computing system 8a and 8b and charging devices 11a . . . 11n and 12a . . . 12n) may be retrieved via a power grid (e.g., power transmission grid 7). Utility(s) 5 may comprise any type of electrical power supplier(s) that produces and/or distributes electrical power (i.e., across power transmission grid 7). Utility(s) 5 may produce and/or distribute any type of electrical power including, inter alia, fossil fuel generated power, steam generated power, hydro generated power, solar generated power, wind generated power, fuel cell generated power, etc. Computing systems 8a and 8b may each comprise a memory system. The memory system may comprise a single memory system. Alternatively, the memory system may comprise a plurality of memory systems. The memory system may be internal to computing systems 8a and 8b or external to computing systems 8a and 8b. Computing system 8a and 8b may each comprise a software application (e.g., a charge management system (CMS)) for controlling functionality. Computing system 8a comprises a system for monitoring a power grid (e.g., associated with power generated by utility(s) 5) frequency (e.g., 60 Hertz (Hz)) and enabling a customized charging process associated with enabling charging devices 11a . . . 11n to charge rechargeable power sources 14a . . . 14n based on a value of a monitored frequency and additional data (e.g., data associated with the operation of charging devices 12a . . . 12n). Computing system 8b comprises a system for monitoring a power grid (e.g., associated with power generated by utility(s) 5) frequency (e.g., 60 Hertz (Hz)) and enabling a customized charging process associated with enabling charging devices 12a . . . 12n to charge rechargeable power sources 15a . . . 15n based on a value of a monitored frequency and additional data (e.g., data associated with the operation of charging devices 11a . . . 11n). Although system 2 is described with respect to monitoring a nominal frequency of 60 Hz (i.e., associated with power generated by utility(s) 5 and used in power generation in the United States), note that system 2 may be used to monitor any nominal frequency value. For example, system 2 may be used to monitor a nominal frequency value of 50 Hz (i.e., used in Europe, Africa, Asia, Australia, etc).

System 2 is configured to enable several independent methods to determine when to charge rechargeable power sources 14a . . . 14n and 15a . . . 15n (e.g., within battery operated devices) and how quickly rechargeable power sources 14a . . . 14n and 15a . . . 15n should be charged. Note that although system 2 is described with respect to charging or recharging an electric and/or electric hybrid vehicle system 2 may be configured to charge and recharge any battery-operated device such as, inter alia, rechargeable scooters, consumer electronics, uninterruptible power supply (UPS) battery backup systems, etc. Each of computing systems 8a and 8b comprises a CMS (e.g., a software application) that is aware of when an electric vehicle (i.e., rechargeable power sources 14a . . . 14n and 15a . . . 15n via charging devices 11a . . . 11n and 12a . . . 12n) is plugged in to power transmission grid 7 in order to charge the batteries. The CMS could reside within the vehicle itself or at an electric outlet to which the vehicle is plugged into. The CMS may evaluate information including, inter alia, a time of day, a vehicle and vehicle owner(s), an amount of load required to charge the vehicle to its peak capacity, and known or anticipated future events that indicate when and how long the vehicle will be needed in the near future. Additionally, the CMS is aware of a current frequency signal level associated with power transmission grid 7. Therefore, the CMS may use the current frequency signal level and the aforementioned information to enable charging devices 11a . . . 11n and 12a . . . 12n to intelligently charge the vehicle(s) so that it is fully charged when needed and will reduce short term generation demand thereby increasing generation efficiency at a power provider's plant and ultimately reducing electric generation costs.

Each CMS may enable several different methods for intelligently charging rechargeable power sources $14a \ldots 14n$ and $15a \ldots 15n$ via charging devices $11a \ldots 11n$ and $12a \ldots 12n$. For example, each CMS may enable a method to trickle charge a vehicle over the next X hours or employ a fast charge causing more electric load for that same time period. Alternatively, each CMS may enable a method to postpone charging altogether based on variable electric rates. Additionally, each CMS may change a charge rate and/or start and stop times based on an owner's electronic calendar information. Alternatively, any combination of the aforementioned methods may be used. For example, a charging method may be enabled based on a current electric load, a current electric cost, and a next anticipated run time.

The following methods (described in detail, infra) for intelligently charging an electric vehicle (e.g., comprising rechargeable power sources $14a \ldots 14n$ and $15a \ldots 15n$) via a charging device (e.g., charging devices $11a \ldots 11n$ and $12a \ldots 12n$) may be enabled by system 2 (i.e., comprising a CMS) of FIG. 1:

1. Implementation of a CMS for intelligently charging an electric vehicle based on a frequency signal associated with a power signal from power transmission grid 7.
   A. The CMS may implement gradual ramp up (acceleration) charging method.
   B. The CMS may implement delaying, pausing, and/or starting and stopping charges multiple times through a charge cycle.
   C. The CMS may implement a variable load demand.
   D. Implementation of a grid management system.
2. Independent load-side charging method.
3. Cooperative load-side charging method.
4. Off-peak load-side charging method.
5. Known future events load-side charging method.
6. Consumer load historical usage method.

Implementation of a CMS

A CMS may comprise a computer program product which resides at a residence or business. The CMS is capable of controlling one or more electrical outlets and determining how much of a load it allows a downstream device to create. The CMS may be a filter of sorts that changes an amount of amps drawn from power transmission grid 7. The CMS may be optionally connected to a grid management system (GMS). The CMS may implement a gradual acceleration method of 3 stage method of charging an electric vehicle via a charging device.

Gradual Acceleration Method

In all methods for intelligently charging rechargeable power sources $14a \ldots 14n$ and $15a \ldots 15n$ via charging devices $11a \ldots 11n$ and $12a \ldots 12n$, system 2 may enable gradually increasing a load on power transmission grid 7 (i.e., rather than instantly drawing a full load) as instantly drawing a full load may cause the frequency signal of the grid to drop requiring a power company to fall back to demand (short-term) generation which may be costly. Since bulk generation may require about an hour to come on line system 2 may create a gradual acceleration of energy demand that ramps up to its full potential in a time period greater than an hour.

3 Stage Charging Method

Chargers (e.g., charging devices $11a \ldots 11n$ and $12a \ldots 12n$) may be enabled to operate in a variety of stages such as, inter alia, a 3 stage: bulk, acceptance, or absorb and float stage. During a bulk stage, a charging current is held at a constant and high value (level) until a voltage of a rechargeable power source (e.g., rechargeable power sources $14a \ldots 14n$ and $15a \ldots 15n$) reaches a certain predefined level. The bulk stage is used to rapidly raise a state of charge (SOC) from a low discharged level to a near 100% charged level. As the SOC approaches 100%, a lower amount of current is required to hold the rechargeable power source at this predefined voltage. During an acceptance or absorb and float stage, a fixed and higher voltage level is used with a current level declining over time. This voltage level insures that chemical processes needed to recharge the battery occur to completion. The acceptance stage is disconnected at a predetermined ending current level (i.e., a current needed to hold the voltage will decline as the SOC increases) or a predefined period of time. After completion of the acceptance stage, the battery (e.g., any of rechargeable power sources $14a \ldots 14n$ and $15a \ldots 15n$) is placed on a float or trickle charge to maintain the battery at 100% SOC. The CMS will interact with a charging device (e.g., any of charging devices $11a \ldots 11n$ and $12a \ldots 12n$) by intelligently understanding the implications of stopping a charging process at each phase of operation and state of charge. A charging device operating in a float stage may terminate the float charge level for many hours, if necessary, due to a low grid power condition (e.g., associated with power transmission grid 7), without significantly reducing a functionality of a vehicle due to low battery SOC. A charging device operating in the bulk stage may be capable of contributing a greater reduction in demand, thereby enabling a greater demand response. However, disabling a bulk stage for lower values of a SOC, will greatly affect the ability of a vehicle to be used by a user due to a smaller amount of energy available from the battery. Likewise, for higher values of a SOC, the charging device may be capable of contributing a greater reduction in power demand, thereby increasing demand responses with less impact to the vehicle's usability. Therefore, the SOC and charge stage will be used to determine the extent of the response (e.g., lower SOC values accept shorter curtailments in charging and higher SOC values accept longer periods of curtailment).

Grid Management System (GMS)

The GMS comprises a computer program product and a centralized database. The GMS may be maintained by a power company (e.g., utility(s) 5). The GMS comprises the capability to coordinate between and send instructions to CMS units.

Independent Load-Side Charging Method

During an independent load-side charging method, a CMS charges a vehicle based solely on a frequency level of the power transmission grid. As a frequency level of the power transmission grid falls below 60 Hz, the CMS reduces the electric load by decreasing the amount of current used to charge an electric vehicle. As the frequency level falls further below the power transmission grid target frequency level (60 Hz), additional electric load is reduced. Likewise, as the frequency level increases above the power transmission grid target frequency level (60 Hz), additional electric load is increased. The following implementation example 1 illustrates this feature.

Example 1

Sally returns to her home late in the evening and has no future plans for that day so she parks her electric vehicle and plugs it in to the power transmission grid (e.g., via one of charging devices $11a \ldots 11n$ or $12a \ldots 12n$). The CMS enables a method for charging the vehicle at variable rates based on the current frequency level of the power transmission grid. Once the electric vehicle has a full charge, the CMS enables a method for providing a trickle charge to keep the batteries topped off.

Cooperative Load-Side Charging Method

During a cooperative load-side charging method, the CMS(s) is aware of additional electric vehicles connected to the power transmission grid and attempts to distribute collective charge cycles of all the electric vehicles. For example, if 10 additional electric vehicles are connected to the power transmission grid then the CMS will determine an aggregate load to charge all 10 electric vehicles and enable charging only a percentage of the total and cycle through each subset until all are charged. The cooperative load-side charging method may be combined with the known future events load-side charging method as described, infra. Additional strategies may be implemented to evenly distribute a load across the power transmission grid including reducing each CMS load equally so that all 10 electric vehicles complete their charge by a target time frame. The following implementation example 2 illustrates this feature.

Example 2

Sally returns to her home late in the evening and has no future plans for that day so she parks her electric car and plugs it in to the power transmission grid (e.g., via one of charging devices 11a . . . 11n or 12a . . . 12n). The CMS sends a connected device status to a GMS which queries a central data warehouse to determine that Sally's vehicle is a 10th electric vehicle connected to the power transmission grid. The GMS determines that it can best distribute a load by charging only 2 electric vehicles at a time. Sally's CMS then enable charging her vehicle for 20 minutes, then goes off-line for 1 hour and 20 minutes at which time her CMS begins charging her electric vehicle for another 20 minutes. This cycle continues until all 10 vehicles are charged or until new vehicles are added or removed from the power transmission grid.

Off-Peak Load-Side Charging Method

During an off-peak load-side charging method, the CMS either comprises programmed variable charge rates or queries a GMS for a current rate table comprising charge rates. Charge rates comprise rates that a power company charges for power consumption. The rates are variable according to a time of day. Some power companies charge different rates at different times of day or days of the week. Therefore, it is beneficial to charge an electric vehicle during a time of day that is least expensive. In this situation, the CMS understands when the electric vehicle was connected, when the electric vehicle would likely be used next, and when the electric vehicle should begin charging in order to achieve a lowest recharge cost for the electric vehicle. The following implementation example 3 illustrates this feature.

Example 3

Sally returns to her home at 7 pm and has no future plans for that day so she parks her electric car and plugs it in to the power transmission grid (e.g., via one of charging devices 11a . . . 11n or 12a . . . 12n). The CMS queries a current rate table comprising charge rates and her calendar and determines that she will not need the vehicle until 7:30 am the following morning. Additionally, the CMS understands that the cost per kilowatt is 20% cheaper after 10:00 pm and that it is capable of fully charging the electric vehicle battery pack if it delays the start time until 10:00 pm. Sally's vehicle begins a gradual charging cycle starting at 10 pm and ramps up in energy usage by 11 pm where it is drawing a full load on that circuit for a stage 1 charge to the electric vehicle.

Known Future Events Load-Side Charging Method

During a known future events load-side charging method, the CMS has access to the electric vehicle owner's electronic calendar and may query the electronic calendar to determine when the next usage of the vehicle is required. The electronic calendar may comprise a location field associated with a calendar event used to determine if the electric vehicle would be in use. A calendar entry may indicate, inter alia, a vacation day, an appointment across town, a remote teleconference, etc. Additional location information may be used including, inter alia, vehicle GPS information, historical information retrieved from data stored in a log, etc. Once the CMS has the next known location with an associated time, it may use that as a constraint within one of the alternative methods described herein. This location information allows the CMS to make more informed decisions as to when and how much load to generate on the grid for recharging the electric vehicle. The following implementation example 4 illustrates this feature.

Example 4

Sally returns to her home at 5:30 pm and has no future plans for that day so she parks her electric car and plugs it in to the power transmission grid (e.g., via one of charging devices 11a . . . 11n or 12a . . . 12n). The CMS reads her calendar and determines that she is not going to work at 7:30 am the following day (i.e., as she usually does) because she has an appointment with a doctor at 10:30 am. Additionally, the CMS queries the power company costs and determines that they are anticipating a high load the next day because of forecasted higher than average temperatures. The CMS additionally monitors the power transmission grid frequency level and determines that it should begin charging Sally's electric vehicle at 10:30 pm with a 1 hour gradual load increase so that by 11:30 pm the electric vehicle is drawing an 80% capacity load which it will maintain until 8:00 am. At 8:00 am, the CMS will drop to a 3rd stage trickle charge until 10:00 am when the electric vehicle will be completely charged and ready to go. The CMS avoids the more expensive power costs charged between 5:30 pm and 10:00 pm and distributed a charging cycle over a 12 hour period which helped reduce short-term demand generation at the power plant. Finally, the CMS also varied the charging load every few minutes to help counter frequency changes on the grid.

Consumer Load Historical Usage

During a consumer load historical usage method, the CMS has access to a day of week and time of day information, as well as a historical load profile of a residence. As the CMS is able to increase the charger rate in response to frequency excursions above 60 Hz, the CMS notes that the vehicle owner will have a low period of residential usage during a certain time period. The following implementation example 5 illustrates this feature.

Example 5

Sally returns to her home at 7 pm and has no future plans for that day so she parks her electric car in plugs it in to the power transmission grid (e.g., via one of charging devices 11a . . . 11n or 12a . . . 12n). The CMS queries a historical load profile data for the residence and notes that a time period between 1 am and 6 am comprises a very low period of electric consumption. Based on this information, the CMS enables a grid over-frequency mode between those times, thereby allowing for an increase of a charging rate in response to a grid frequency greater than 60 Hz. The CMS computes the charger rates required to fully charge the vehicle by 6 am and begins a 3 phase charge cycle. At 2:30 am, the CMS detects that the line frequency has risen to 60.05 Hz. The charger is operating in bulk stage and has additional current capacity. The CMS increases the rate of charge by 25% for the duration of the grid over-frequency event. At 3 am when the grid frequency falls within normal bounds, the CMS reduces the rate of charge to its previous value. It recalculates the remaining charge and completes charging the vehicle sooner than originally planned.

Figure 2:
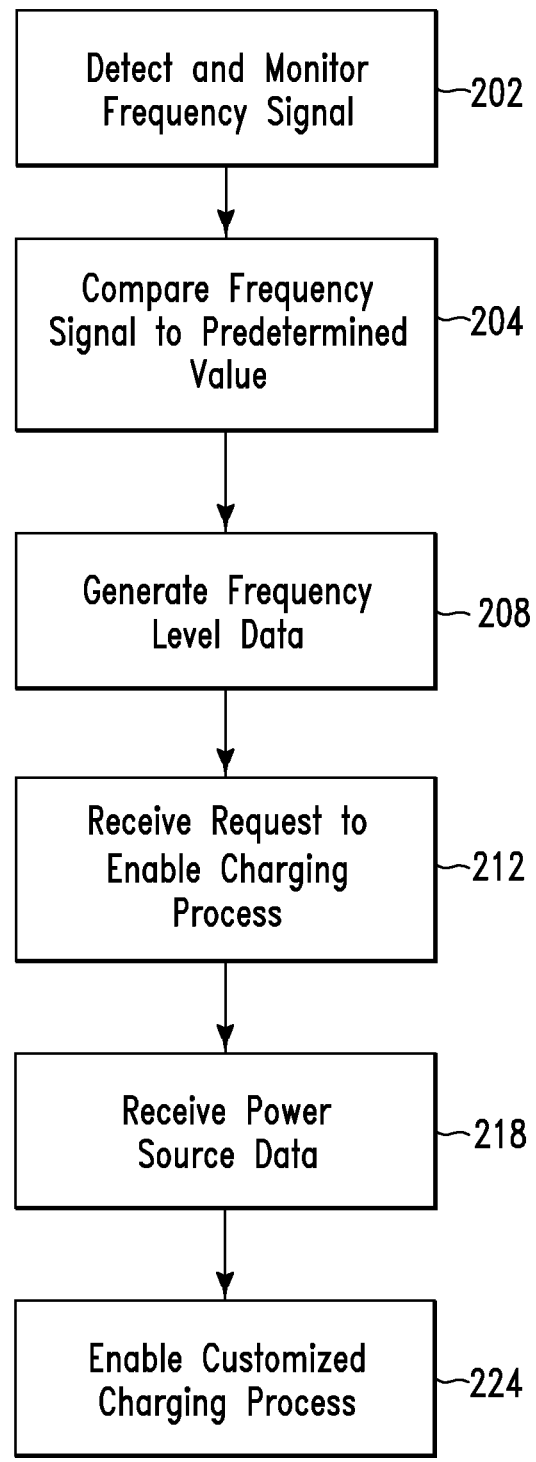
FIG. 2 illustrates a flowchart describing an algorithm used by the system of FIG. 1 for monitoring a frequency signal associated with a supply voltage retrieved from a power grid and enabling a customized charging process associated with charging rechargeable power sources, in accordance with embodiments of the present invention.

FIG. 2 illustrates a flowchart describing an algorithm used by system 2 of FIG. 1 for monitoring a frequency signal associated with a supply voltage retrieved from a power grid and enabling a customized charging process associated with charging rechargeable power sources, in accordance with embodiments of the present invention. In step 202, a computing system (e.g., a computer processor of computing system 8 of FIG. 1) detects and monitors a frequency signal associated with an input voltage signal (i.e., from a utility (e.g., utility(s) 5 of FIG. 1) via a power transmission grid (e.g., power transmission grid 7 of FIG. 1)) used for powering a plurality of power consumption devices (e.g., charging devices 11a . . . 11n and 12a . . . 12n of FIG. 1) at a specified location (e.g., specified location 18a or 18b of FIG. 1). In step 204, the computing system compares the frequency signal to a predetermined frequency value (i.e., the expected frequency value). For example, the predetermined frequency value may comprise, inter alia, 60 Hz, 50 Hz, etc. In step 208, the computing system generates frequency level data associated with said monitoring performed in step 202. In step 212, the computing system receives a request from a first user to enable a charging process for charging a rechargeable power source. In step 218, the computing system receives first power source data associated with the rechargeable power source and the first user. In step 224, the computing system enables a customized charging process (i.e., based on the frequency level data and/or the first power source data) associated with charging the rechargeable power source.

Figure 3:
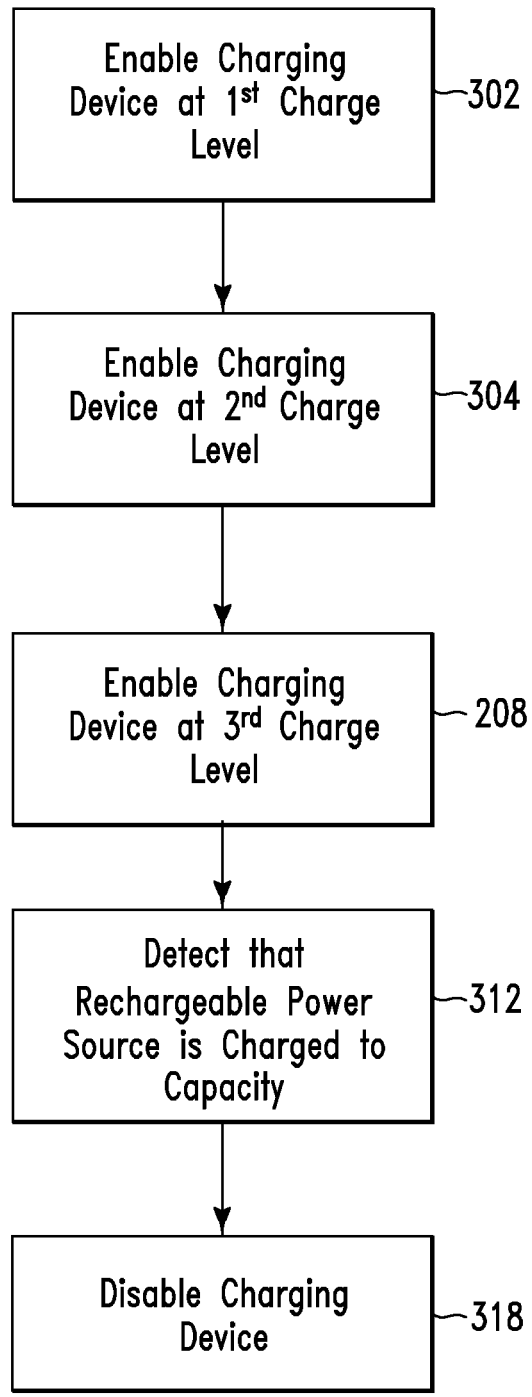
FIG. 3 illustrates a flowchart describing an algorithm detailing a first embodiment for enabling the customized charging process of a step of the algorithm of FIG. 2, in accordance with embodiments of the present invention.

FIG. 3 illustrates a flowchart describing an algorithm detailing a first embodiment for enabling the customized charging process of step 224 of the algorithm of FIG. 2, in accordance with embodiments of the present invention. In step 302, the computing system enables a charging device (e.g., a battery charger) connected to the rechargeable power source at a first specified charge level for a first specified time period. In step 304, the computing system enables (i.e., after disabling the first specified charge level) the charging device at a second specified charge level for a second specified time period. The second specified charge level exceeds the first specified charge level. In step 308, the computing system optionally enables (i.e., after disabling the second specified charge level) the charging device at a third specified charge level for a third specified time period. The second specified charge level exceeds the third specified charge level. In step 312, the computing system detects that the rechargeable power source has been charged to peak capacity. In step 318, the computing system disables (i.e., in response to step 312) the charging device.

Figure 4:
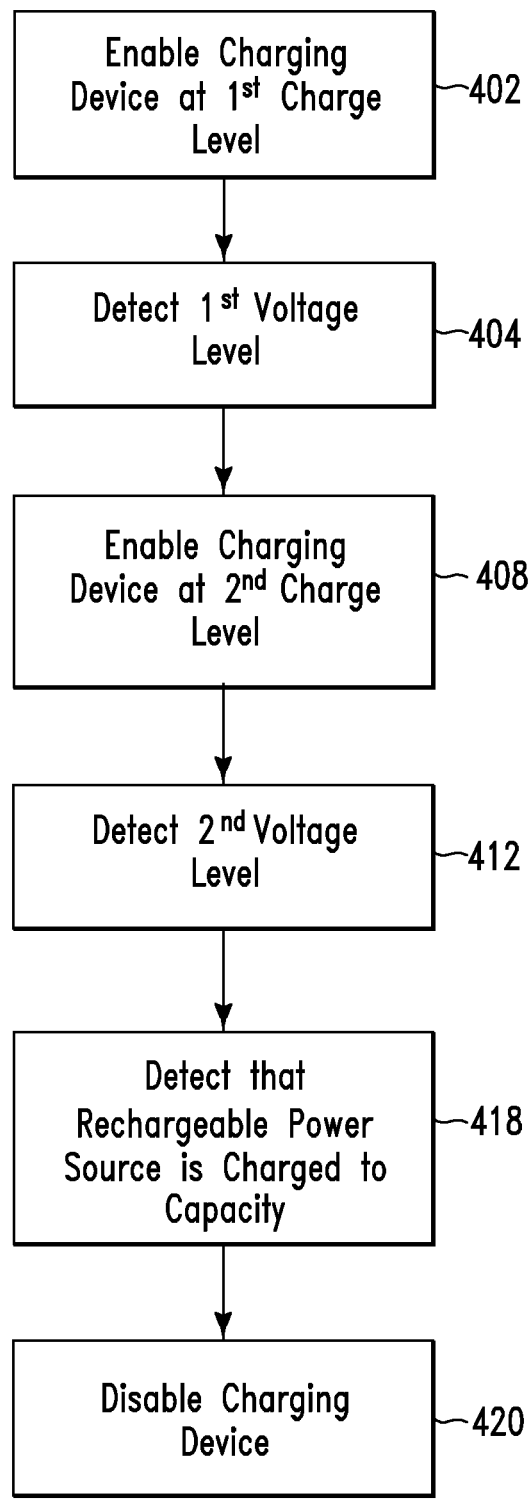
FIG. 4 illustrates a flowchart describing an algorithm detailing a second embodiment for enabling the customized charging process of a step of the algorithm of FIG. 2, in accordance with embodiments of the present invention.

FIG. 4 illustrates a flowchart describing an algorithm detailing a second embodiment for enabling the customized charging process of step 224 of the algorithm of FIG. 2, in accordance with embodiments of the present invention. In step 402, the computing system enables a charging device (e.g., a battery charger) connected to the rechargeable power source at a first specified charge level. In step 404, the computing system detects or measures a first specified voltage level of the rechargeable power source. In step 408, the computing system enables (i.e., after disabling the first specified charge level and in response to the first specified voltage level) the charging device at a second specified charge level. The second specified charge level exceeds the first specified charge level. In step 412, the computing system detects or measures a second specified voltage level of the rechargeable power source. In step 418, the computing system detects (i.e., based on the second specified voltage level) that the rechargeable power source has been charged to peak capacity. In step 420, the computing system disables (i.e., in response to step 418) the charging device.

Figure 5:
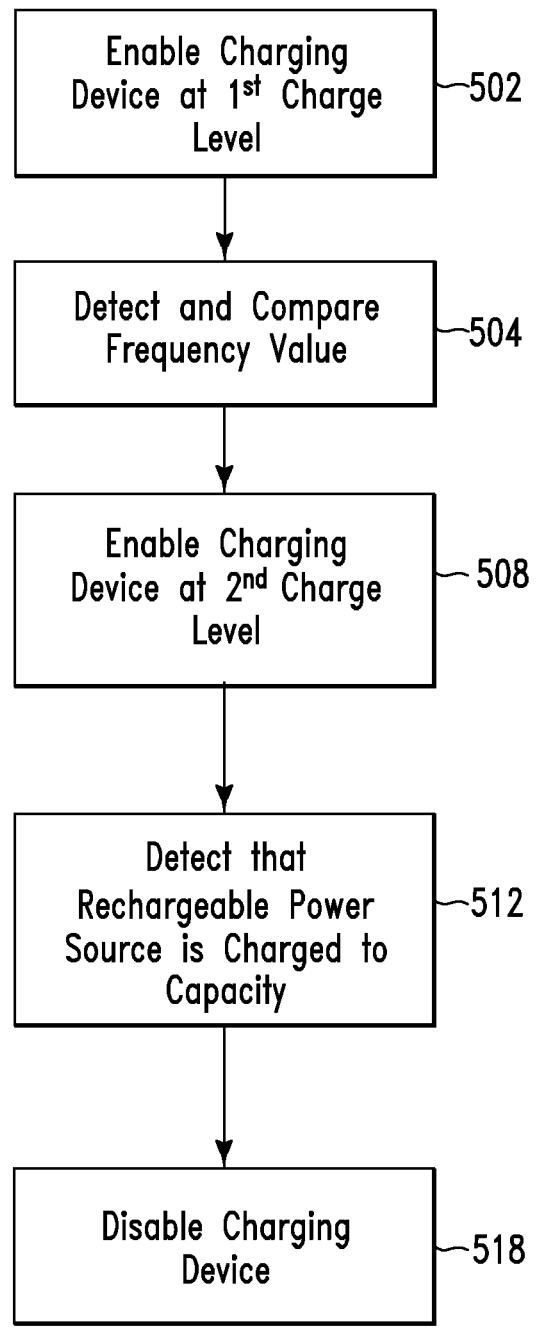
FIG. 5 illustrates a flowchart describing an algorithm detailing a third embodiment for enabling the customized charging process of a step of the algorithm of FIG. 2, in accordance with embodiments of the present invention.

FIG. 5 illustrates a flowchart describing an algorithm detailing a third embodiment for enabling the customized charging process of step 224 of the algorithm of FIG. 2, in accordance with embodiments of the present invention. In step 502, the computing system enables a charging device (e.g., a battery charger) connected to the rechargeable power source at a first specified charge level. In step 504, the computing system (i.e., after detecting that the frequency signal comprised a first value less that the predetermined value) detects that frequency signal currently comprises a second value that is greater than or equal to the predetermined frequency value. In step 508, the computing system enables (i.e., after disabling the first specified charge level and in response to the results of step 504) the charging device at a second specified charge level. The second specified charge level exceeds the first specified charge level. In step 512, the computing system detects that the rechargeable power source has been charged to peak capacity. In step 518, the computing system disables (i.e., in response to step 512) the charging device.

Figure 6:
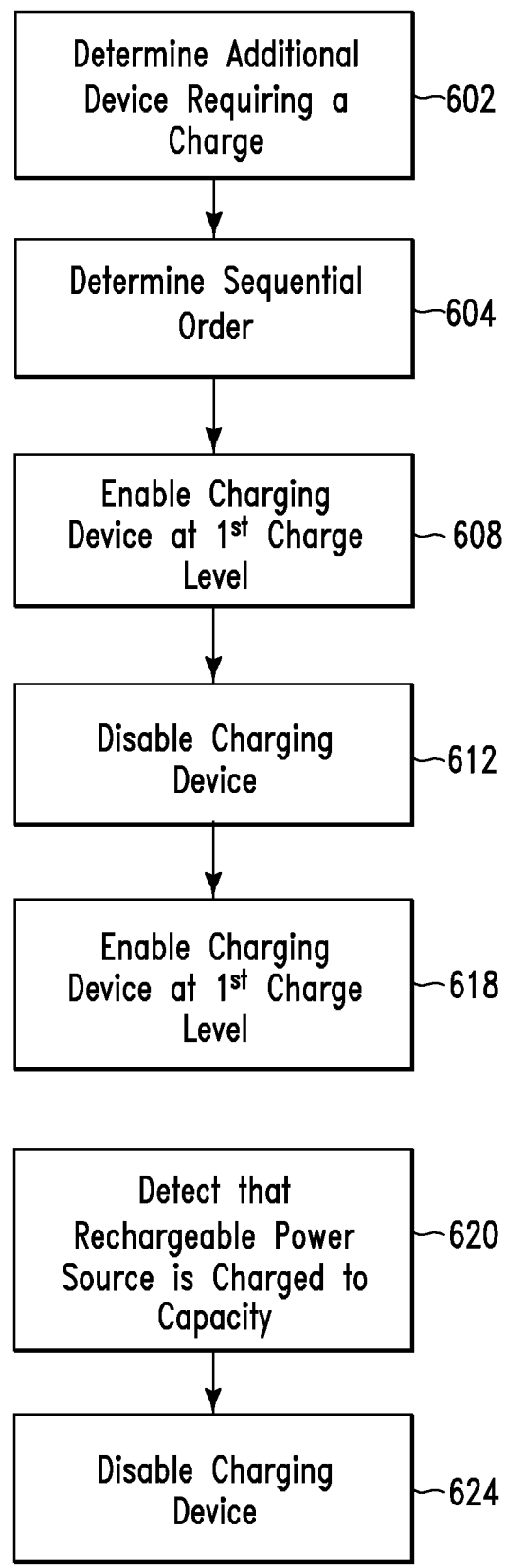
FIG. 6 illustrates a flowchart describing an algorithm detailing a fourth embodiment for enabling the customized charging process of a step of the algorithm of FIG. 2, in accordance with embodiments of the present invention.

FIG. 6 illustrates a flowchart describing an algorithm detailing a fourth embodiment for enabling the customized charging process of step 224 of the algorithm of FIG. 2, in accordance with embodiments of the present invention. In step 602, the computing system determines that a plurality of different computing devices associated with a plurality of different rechargeable power sources at a plurality of different locations have received requests for initiating a plurality of customized charging processes associated with charging the plurality of rechargeable power sources. In step 604, the computing system determines a sequential order of the requests (i.e., for initiating the plurality of customized charging processes) and a request to enable the first customized charging process. In step 608, the computing system enables a charging device (e.g., a battery charger) connected to the rechargeable power source at a first specified charge level and a first specified time for a first specified time period. In step 612, the computing system disables (i.e., in accordance with the sequential order) the charging device at a second specified time for a second specified time period. In step 618, the computing system enables (i.e., after step 612 and in accordance with the sequential order) the charging device at the first specified charge level and a third specified time for the first specified time period. In step 620, the computing system detects that the rechargeable power source has been charged to peak capacity. In step 624, the computing system disables (i.e., in response to step 620) the charging device.

Figure 7:
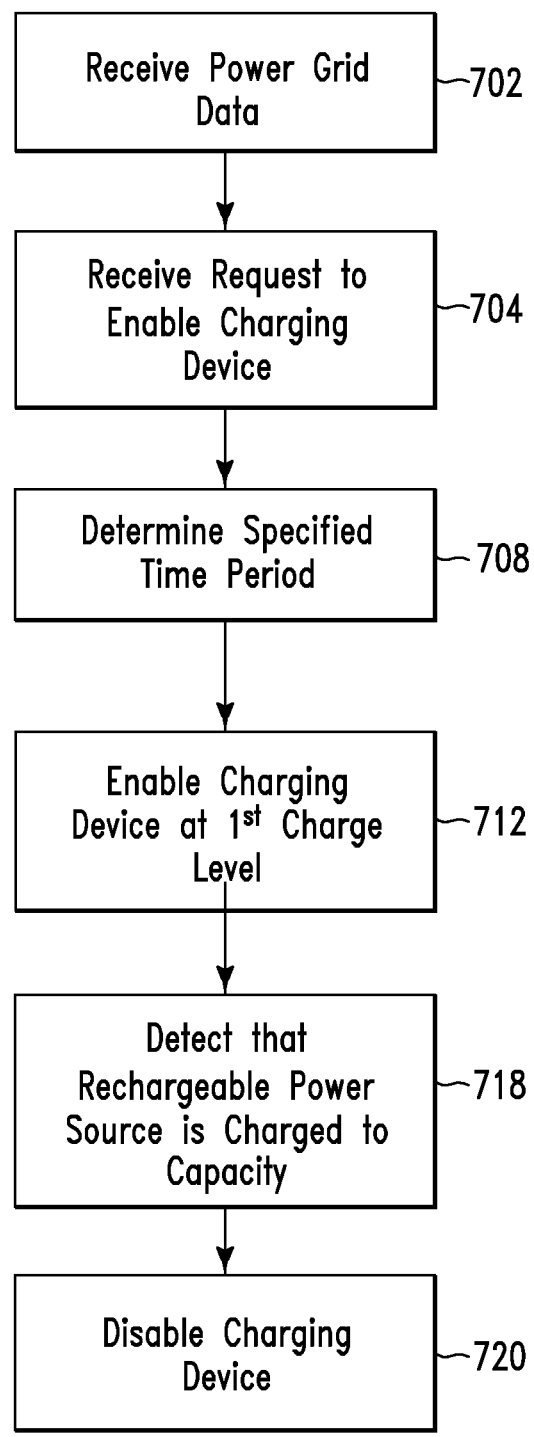
FIG. 7 illustrates a flowchart describing an algorithm detailing a fifth embodiment for enabling the customized charging process of a step of the algorithm of FIG. 2, in accordance with embodiments of the present invention.

FIG. 7 illustrates a flowchart describing an algorithm detailing a fifth embodiment for enabling the customized charging process of step 224 of the algorithm of FIG. 2, in accordance with embodiments of the present invention. In step 702, the computing system receives power grid data associated with a power transmission grid supplying power. In step 704, the computing system receives a request for enabling a charging device (e.g., a battery charger) connected to the rechargeable power source. In step 708, the computing system determines (based on the power grid data) a specified time period that power transmission grid supplies power at a discounted rate. In step 712, the computing system enables the charging device at a first specified time period occurring during the specified time period that power transmission grid supplies power at a discounted rate at a first specified charge level. In step 718, the computing system detects that the rechargeable power source has been charged to peak capacity. In step 720, the computing system disables (i.e., in response to step 718) the charging device.

Figure 8:
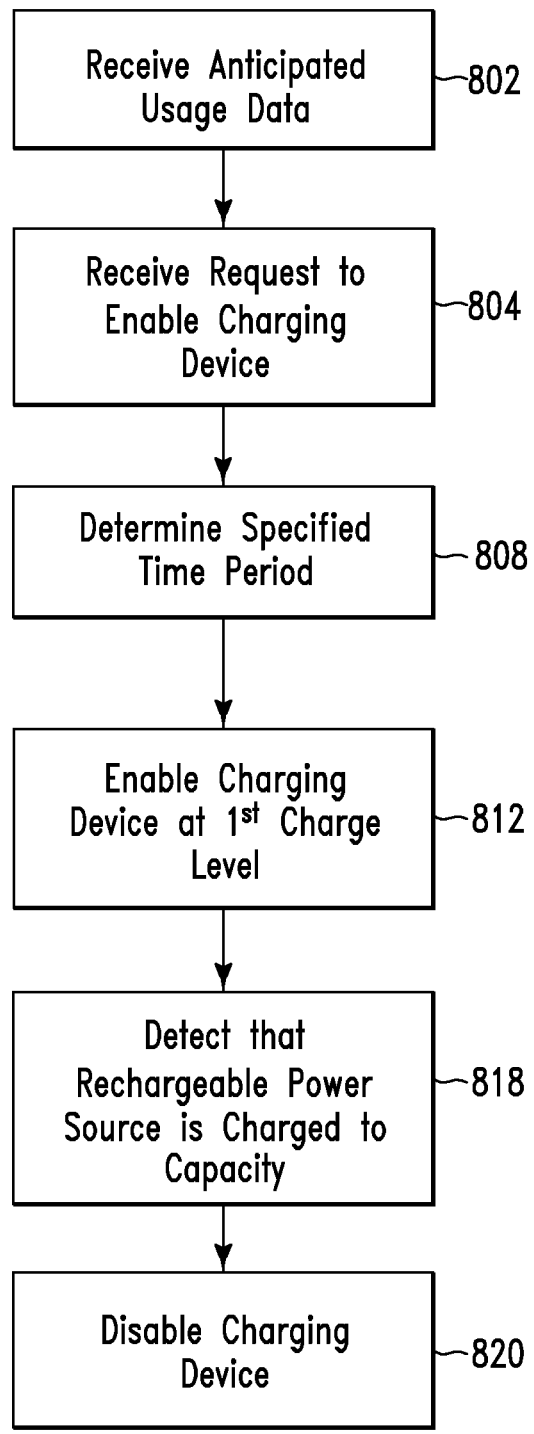
FIG. 8 illustrates a flowchart describing an algorithm detailing a sixth embodiment for enabling the customized charging process of a step of the algorithm of FIG. 2, in accordance with embodiments of the present invention.

FIG. 8 illustrates a flowchart describing an algorithm detailing a sixth embodiment for enabling the customized charging process of step 224 of the algorithm of FIG. 2, in accordance with embodiments of the present invention. In step 802, the computing system receives anticipated usage data associated with associated with an anticipated usage of a power transmission grid supplying power. The anticipated usage data (e.g., weather related data associated with predicted weather conditions) comprises first data associated with a predicted low power demand timeframe for the power transmission grid and second data associated with a predicted high power demand timeframe for the power transmission grid. In step 804, the computing system receives a request for enabling a charging device (e.g., a battery charger) connected to the rechargeable power source. In step 808, the computing system determines (based on the anticipated usage data) a specified time period associated with the predicted low power demand timeframe for the power transmission grid. In step 812, the computing system enables the charging device at a first specified time occurring during the specified time period associated with the predicted low power demand timeframe. In step 818, the computing system determines (based on the anticipated usage data) that a current time is within the predicted high power demand timeframe. In step 820, the computing system disables (i.e., in response to step 818) the charging device.

Figure 9:
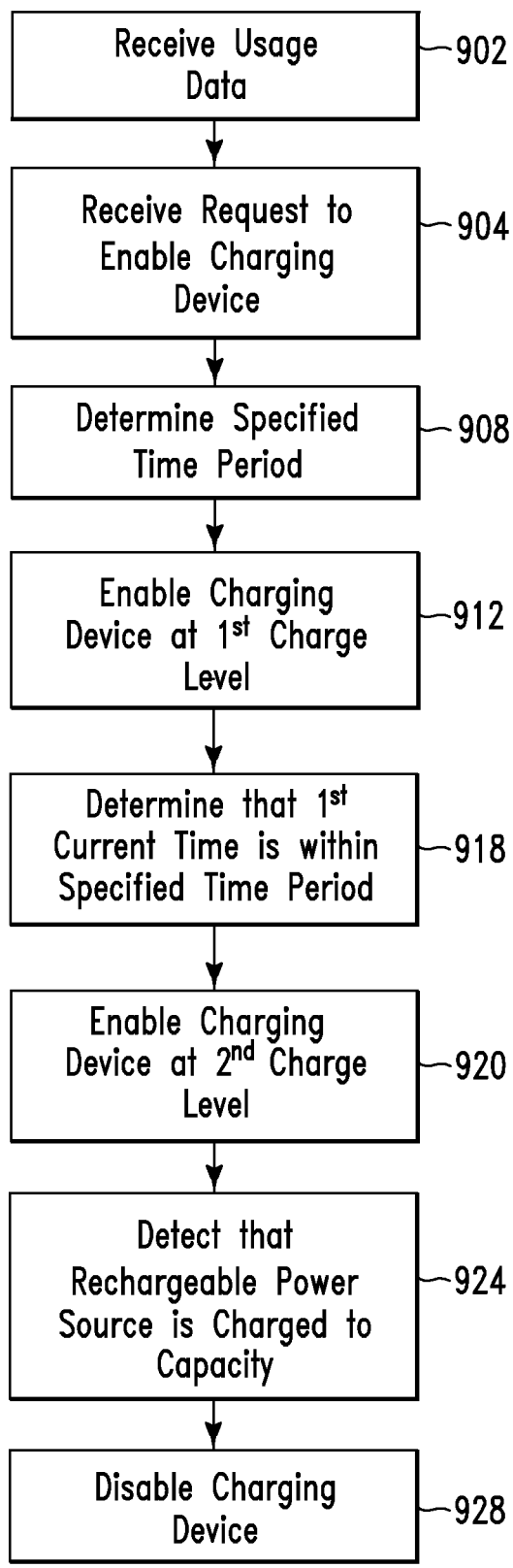
FIG. 9 illustrates a flowchart describing an algorithm detailing a seventh embodiment for enabling the customized charging process of a step of the algorithm of FIG. 2, in accordance with embodiments of the present invention.

FIG. 9 illustrates a flowchart describing an algorithm detailing a seventh embodiment for enabling the customized charging process of step 224 of the algorithm of FIG. 2, in accordance with embodiments of the present invention. In step 902, the computing system receives usage data associated with past usage data for the specified location and an anticipated usage power demand for the specified location. In step 904, the computing system receives a request for enabling a charging device (e.g., a battery charger) connected to the rechargeable power source. In step 908, the computing system determines (based on the usage data) a first specified time period associated with a first predicted low power demand timeframe for the specified location. In step 912, the computing system enables the charging device at a first charge level and a first specified time occurring during the first specified time period. In step 918, the computing system determines (i.e., based on the usage data) that a first current time is within a second specified time period associated with a first predicted high power demand timeframe for the specified location. In step 920, the computing system enables (i.e., at a second specified time occurring during the second specified time period) the charging device at a second specified charge level. The said second specified charge level is less than the first specified charge level. In step 924, the computing system detects that the rechargeable power source has been charged to peak capacity. In step 928, the computing system disables (i.e., in response to step 924) the charging device.

Figure 10:
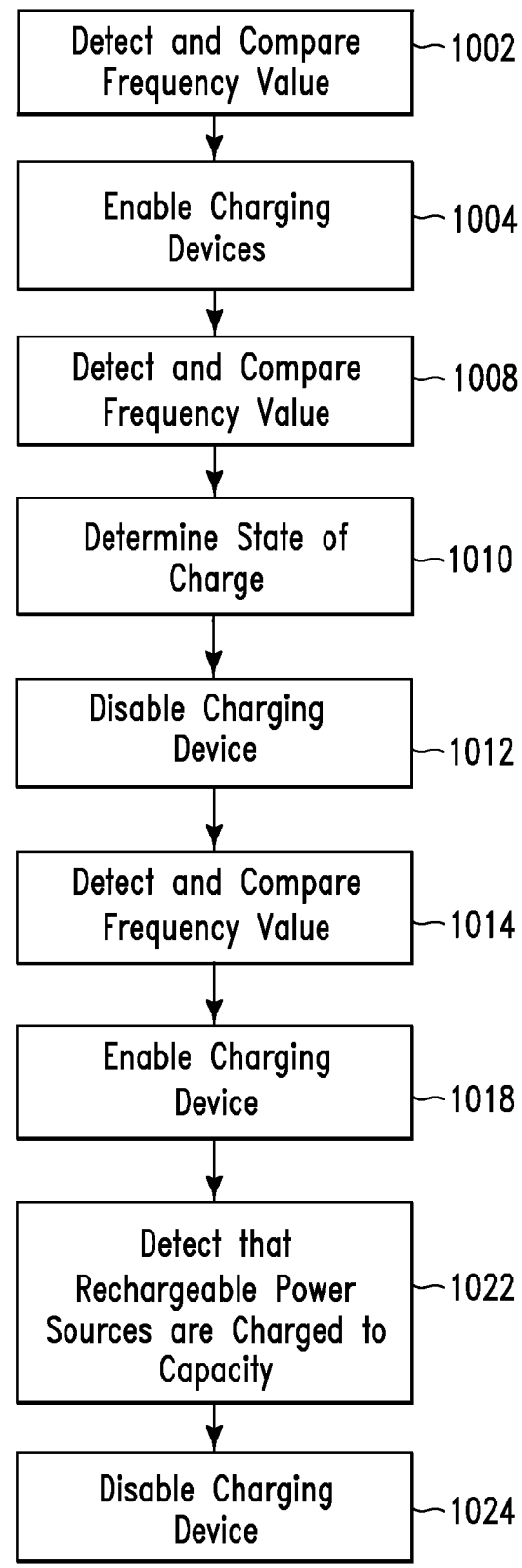
FIG. 10 illustrates a flowchart describing an algorithm detailing an eighth embodiment for enabling the customized charging process of the algorithm of FIG. 2, in accordance with embodiments of the present invention.

FIG. 10 illustrates a flowchart describing an algorithm detailing an eighth embodiment for enabling the customized charging process of step 224 of the algorithm of FIG. 2, in accordance with embodiments of the present invention. In the algorithm of FIG. 10, the rechargeable power source comprises a first rechargeable power source and a second rechargeable power source for illustration purposes. Note that the rechargeable power source may comprise any number of rechargeable power sources. In step 1002, a computing system determines that the frequency signal currently comprises a value that is equal to or greater than a predetermined frequency value. In step 1004, the computing system enables a first charging device (i.e., connected to the first rechargeable power source) and a second charging device (i.e., connected to the second rechargeable power source) at a first specified charge level. In step 1008 (i.e., after enabling step 1004), the computing system determines that the frequency signal currently comprises a value that is less than the predetermined frequency value. In step 1010, the computing system determines (i.e., in response to step 1008) that a state of charge percentage for the first rechargeable power source is less than a state of charge percentage for the second rechargeable power source. The state of charge percentages may be determined by any method including, inter alia, measuring a voltage level of the first and second rechargeable power sources (e.g., a battery output voltage level). In step 1012, the computing system disables (i.e., in response to the state of charge percentages determined in step 1010) the second charging device. In step 1014, the computing system determines that the frequency signal currently comprises a value that is greater than the predetermined frequency value. In step 1018, the computing system enables (again) the second charging device at a same or different charge level. In step 1022, the computing system detects that the first and second rechargeable power sources have been charged to peak capacity. In step 1024, the computing system disables (i.e., in response to step 1022) the first and second charging devices.

Figure 11:
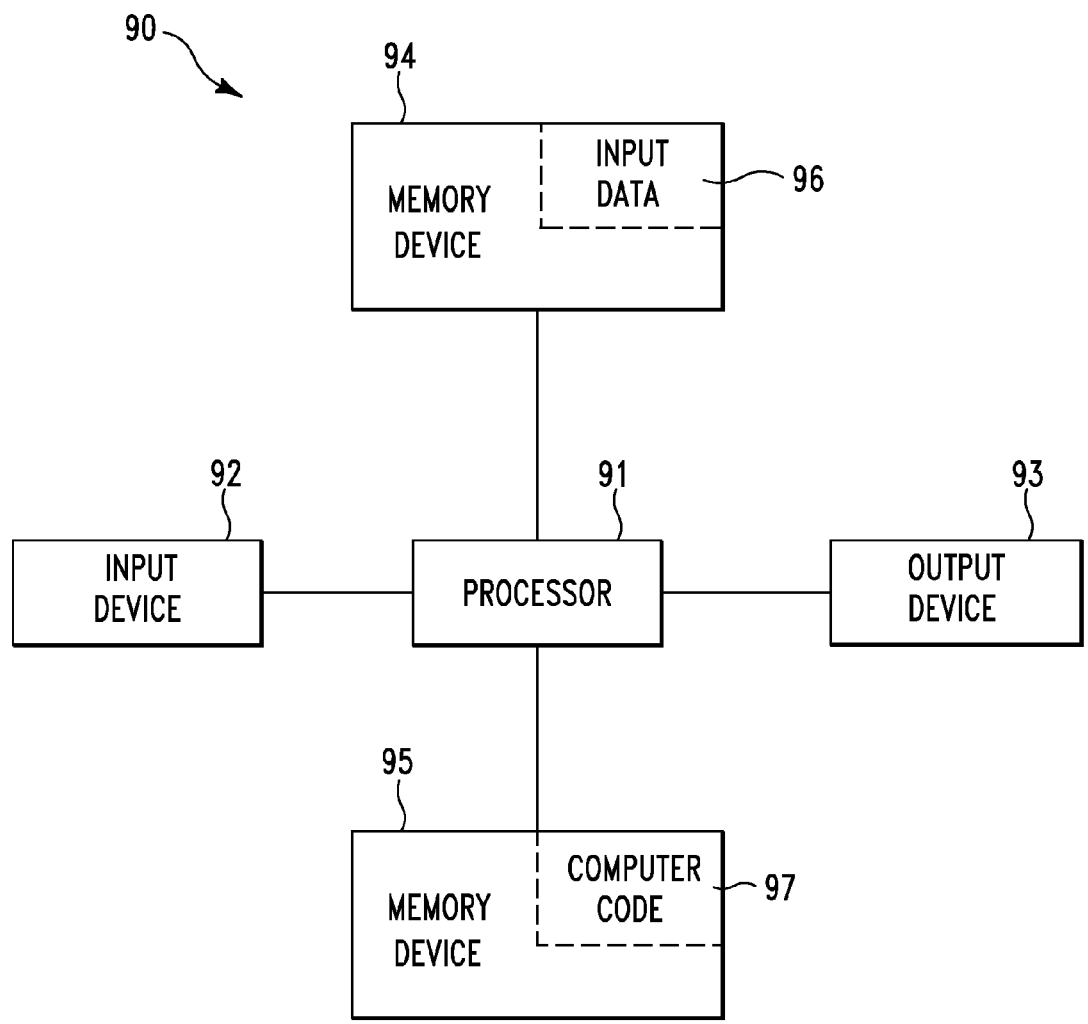
FIG. 11 illustrates a computer apparatus used for monitoring a frequency signal associated with a supply voltage retrieved from a power grid and enabling a customized charging process associated with charging rechargeable power sources, in accordance with embodiments of the present invention.

FIG. 11 illustrates a computer apparatus 90 (e.g., computing system 8a or 8b of FIG. 1) used for monitoring a frequency signal associated with a supply voltage retrieved from a power grid and enabling a customized charging process associated with charging rechargeable power sources, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-10) for monitoring a frequency signal associated with a supply voltage retrieved from a power grid and enabling a customized charging process associated with charging rechargeable power sources. The processor 91 enables the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 10) may comprise the algorithms of FIGS. 2-10 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service supplier who offers to monitor a frequency signal associated with a supply voltage retrieved from a power grid and enable a customized charging process associated with charging rechargeable power sources. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for monitoring a frequency signal associated with a supply voltage retrieved from a power grid and enabling a customized charging process associated with charging rechargeable power sources. In another embodiment, the invention provides a business method that performs the process steps of the invention on a subscription, advertising, and/or fee basis. That is, a service supplier, such as a Solution Integrator, could offer monitor a frequency signal associated with a supply voltage retrieved from a power grid and enable a customized charging process associated with charging rechargeable power sources. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 11 shows the computer system 90 as a particular configuration of hardware and software, any configuration of hardware and software, as would be known to a person of ordinary skill in the art, may be utilized for the purposes stated supra in conjunction with the particular computer system 90 of FIG. 11. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A charging method comprising:
    detecting, by a computer processor of a computing apparatus, a frequency signal associated with an input voltage signal used for powering power consumption devices at a first specified location;
    monitoring, by said computer processor, said frequency signal;
    generating, by said computer processor, frequency level data associated with said monitoring;
    receiving, by said computer processor from a first user, a request to enable a charging process for charging a rechargeable power source;
    receiving, by said computer processor, first power source data associated with said rechargeable power source and said first user;
    receiving, by said computer processor, calendar entry data associated with current and future plans of said first user;
    receiving, by said computer processor, electrical cost data associated with current electrical costs with respect to off peak electrical costs and future electrical costs;
    receiving, by said computer processor, operation data associated with a specified time that said apparatus is required for operation; and
    enabling, by said computer processor based on said frequency level data, said calendar entry data, said electrical cost data, said operation data, and said first power source data, a first customized charging process associated with said charging said rechargeable power source, wherein said first customized charging process comprises automatically postponing a first charge cycle for a first specific time period.

2. The method of claim 1, wherein said rechargeable power source is connected to a charging device, and wherein said first customized charging process further comprises:
    enabling, by said computer processor, said charging device at a first specified charge level for a first specified time period;
    enabling, by said computer processor, said charging device at a second specified charge level for a second specified time period, wherein said second specified charge level exceeds said first specified charge level;
    detecting, by said computer processor, that said rechargeable power source has been charged to peak capacity; and
    disabling, by said computer processor in response to said detecting that said rechargeable power source has been charged to peak capacity, said charging device.

3. The method of claim 2, wherein said first specified charge level comprises a first specified current output level, and wherein said second specified charge level comprises a second specified current output level.

4. The method of claim 2, further comprising:
    before said detecting that said rechargeable power source has been charged to peak capacity, enabling by said computer processor, said charging device at a third specified charge level for a third specified time period, wherein said second specified charge level exceeds said third specified charge level.

5. The method of claim 1, wherein said rechargeable power source is connected to a charging device, and wherein said first customized charging process further comprises:
    enabling, by said computer processor, said charging device at a first specified charge level;
    detecting, by said computer processor, a first specified voltage level of said rechargeable power source;
    enabling, by said computer processor in response to said detecting said first specified voltage level, said charging device at a second specified charge level, wherein said first specified charge level exceeds said second specified charge level;
    detecting, by said computer processor, a second specified voltage level of said rechargeable power source;
    determining, by said computer processor based on said second specified voltage level, that said rechargeable power source has been charged to peak capacity; and
    disabling, by said computer processor in response to said determining, said charging device.

6. The method of claim 1, wherein said first power source data comprises data selected from the group consisting of a current time of day, a type of apparatus using said rechargeable power source, and a required amount of load to charge said rechargeable power source to peak capacity.

7. A computer program product, comprising a computer hardware storage device storing a computer readable program code, said computer readable program code configured to perform a method upon being executed by a computer processor of a computing apparatus, said method comprising:

detecting, by said computer processor, a frequency signal associated with an input voltage signal used for powering power consumption devices at a first specified location;

monitoring, by said computer processor, said frequency signal;

generating, by said computer processor, frequency level data associated with said monitoring;

receiving, by said computer processor from a first user, a request to enable a charging process for charging a rechargeable power source;

receiving, by said computer processor, first power source data associated with said rechargeable power source and said first user;

receiving, by said computer processor, calendar entry data associated with current and future plans of said first user;

receiving, by said computer processor, electrical cost data associated with current electrical costs with respect to off peak electrical costs and future electrical costs;

receiving, by said computer processor, operation data associated with a specified time that said apparatus is required for operation; and enabling, by said computer processor based on said frequency level data, said calendar entry data, said electrical cost data, said operation data, and said first power source data, a first customized charging process associated with said charging said rechargeable power source, wherein said first customized charging process comprises automatically postponing a first charge cycle for a first specific time period.

8. A process for supporting computer infrastructure, said process comprising providing at least one support service for at least one of creating, integrating, hosting, maintaining, and deploying computer-readable code in said computer processor, wherein the code in combination with the computer processor is capable of performing the method of claim 1.

9. A computing system comprising a computer processor coupled to a computer-readable memory unit, said memory unit comprising instructions that when enabled by the computer processor implements a charging method comprising:

detecting, by said computer processor, a frequency signal associated with an input voltage signal used for powering power consumption devices at a first specified location;

monitoring, by said computer processor, said frequency signal;

generating, by said computer processor, frequency level data associated with said monitoring;

receiving, by said computer processor from a first user, a request to enable a charging process for charging a rechargeable power source;

receiving, by said computer processor, first power source data associated with said rechargeable power source and said first user;

receiving, by said computer processor, calendar entry data associated with current and future plans of said first user;

receiving, by said computer processor, electrical cost data associated with current electrical costs with respect to off peak electrical costs and future electrical costs;

receiving, by said computer processor, operation data associated with a specified time that said apparatus is required for operation; and enabling, by said computer processor based on said frequency level data, said calendar entry data, said electrical cost data, said operation data, and said first power source data, a first customized charging process associated with said charging said rechargeable power source, wherein said first customized charging process comprises automatically postponing a first charge cycle for a first specific time period.

10. The computing system of claim 9, wherein said rechargeable power source is connected to a charging device, and wherein said first customized charging process further comprises:

enabling, by said computer processor, said charging device at a first specified charge level for a first specified time period;

enabling, by said computer processor, said charging device at a second specified charge level for a second specified time period, wherein said second specified charge level exceeds said first specified charge level;

detecting, by said computer processor, that said rechargeable power source has been charged to peak capacity; and disabling, by said computer processor in response to said detecting that said rechargeable power source has been charged to peak capacity, said charging device.

11. The computing system of claim 10, wherein said first specified charge level comprises a first specified current output level, and wherein said second specified charge level comprises a second specified current output level.

12. The computing system of claim 10, wherein said method further comprises: before said detecting, enabling by said computer processor, said charging device at a third specified charge level for a third specified time period, wherein said second specified charge level exceeds said third specified charge level.

13. The computing system of claim 9, wherein said rechargeable power source is connected to a charging device, and wherein said first customized charging process further comprises:

enabling, by said computer processor, said charging device at a first specified charge level;

detecting, by said computer processor, a first specified voltage level of said rechargeable power source;

enabling, by said computer processor in response to said detecting said first specified voltage level, said charging device at a second specified charge level, wherein said first specified charge level exceeds said second specified charge level;

detecting, by said computer processor, a second specified voltage level of said rechargeable power source;

determining, by said computer processor based on said second specified voltage level, that said rechargeable power source has been charged to peak capacity; and disabling, by said computer processor in response to said determining, said charging device.

* * * * *